(12) United States Patent
Yabusaki et al.

(10) Patent No.: US 12,054,128 B2
(45) Date of Patent: Aug. 6, 2024

(54) BRAKE SYSTEM

(71) Applicant: TOYOTA JIDOSHA KABUSHIKI KAISHA, Toyota (JP)

(72) Inventors: Naoki Yabusaki, Toyota (JP); Tsuyoshi Andou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 346 days.

(21) Appl. No.: 17/580,106

(22) Filed: Jan. 20, 2022

(65) Prior Publication Data

US 2022/0234563 A1 Jul. 28, 2022

(30) Foreign Application Priority Data

Jan. 27, 2021 (JP) .................................. 2021-011267

(51) Int. Cl.
*B60T 13/66* (2006.01)
*B60T 13/58* (2006.01)
*B60T 17/22* (2006.01)

(52) U.S. Cl.
CPC .......... *B60T 13/588* (2013.01); *B60T 17/221* (2013.01); *B60T 2270/406* (2013.01)

(58) Field of Classification Search
CPC . B60T 13/588; B60T 17/221; B60T 2270/406
USPC ..................................... 188/1.11 E, 156–164
See application file for complete search history.

(56) References Cited

U.S. PATENT DOCUMENTS

| | | | |
|---|---|---|---|
| 9,031,756 B2* | 5/2015 | Baehrle-Miller | B60T 13/741 |
| | | | 701/70 |
| 10,023,165 B2* | 7/2018 | Baehrle-Miller | B60T 13/588 |
| 2006/0186731 A1* | 8/2006 | Bach | B60T 7/104 |
| | | | 303/191 |
| 2011/0224880 A1* | 9/2011 | Baehrle-Miller | B60T 7/085 |
| | | | 701/70 |
| 2015/0217738 A1* | 8/2015 | Blattert | B60T 7/122 |
| | | | 701/70 |
| 2017/0217417 A1* | 8/2017 | Baehrle-Miller | B60T 13/741 |
| 2020/0361431 A1* | 11/2020 | Park | B60T 13/662 |

FOREIGN PATENT DOCUMENTS

JP 2017-528372 A 9/2017

* cited by examiner

*Primary Examiner* — Christopher P Schwartz
(74) *Attorney, Agent, or Firm* — Sughrue Mion, PLLC

(57) ABSTRACT

A vehicle brake system, including: a wheel brake device including an actuator including a piston, a working fluid chamber, an electric motor, and a piston moving mechanism; a working-fluid supply device; and a controller configured to execute: a normal brake control to control a hydraulic braking force to a magnitude corresponding to a braking request; and a parking brake control to cause the wheel brake device to be operated as a parking brake, wherein, in the parking brake control, the controller controls the wheel brake device to generate the hydraulic braking force at a start timing of an operation as the parking brake, controls the actuator to perform a lock operation in which the electric motor is operated to move the piston forward in a state in which the hydraulic braking force is generated, and controls the wheel brake device to release the hydraulic braking force after the lock operation.

6 Claims, 11 Drawing Sheets

FIG.9
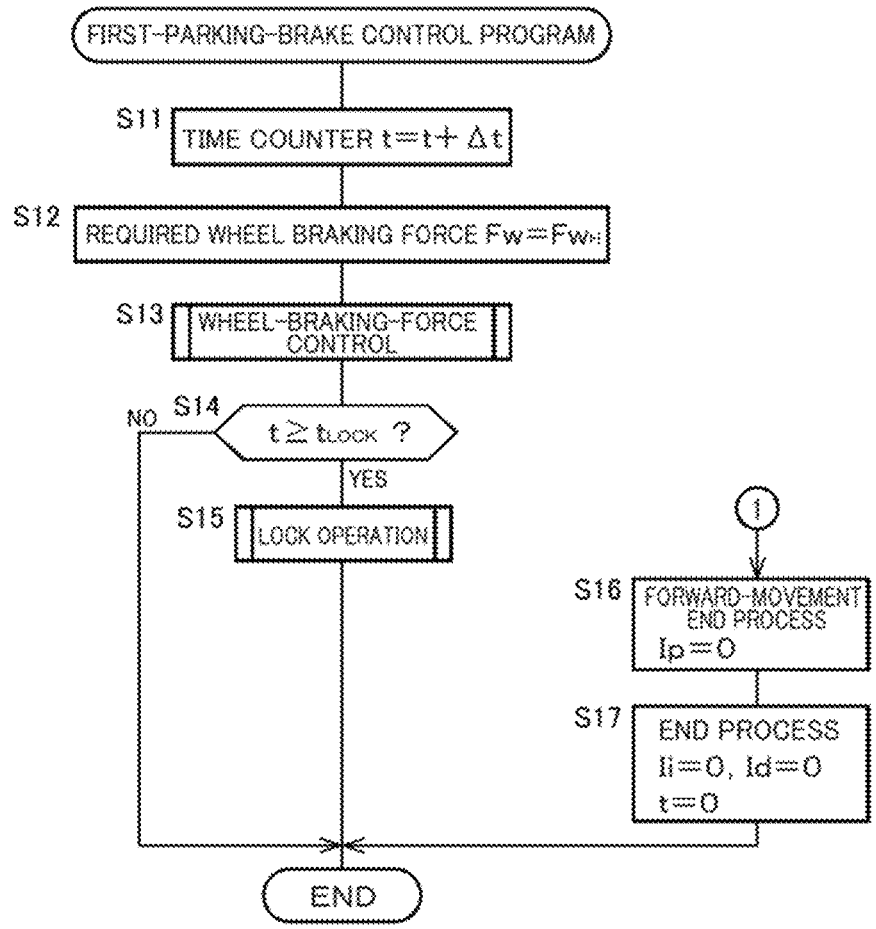
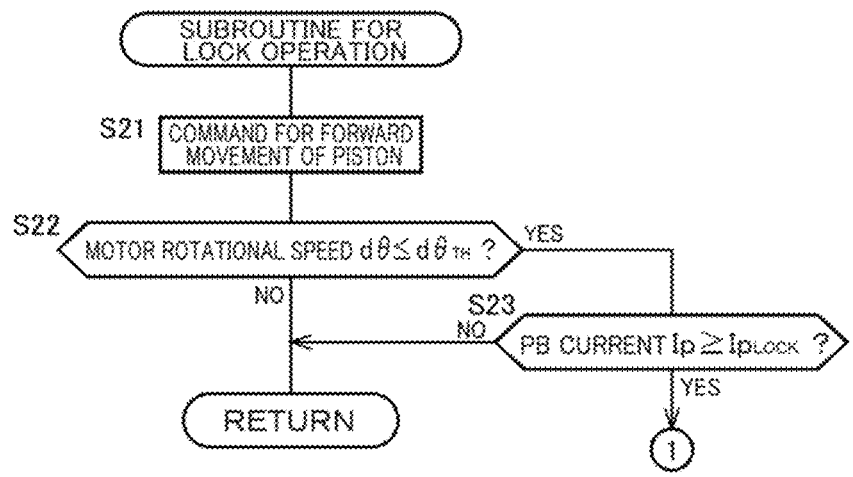

BRAKE SYSTEM

CROSS REFERENCE TO RELATED APPLICATION

The present application claims priority to Japanese Patent Application No. 2021-011267, which was filed on Jan. 27, 2021, the disclosure of which is herein incorporated by reference in its entirety.

BACKGROUND

Technical Field

The following disclosure relates to a vehicle brake system having a parking brake function.

Description of Related Art

An electric parking brake device is configured to generate a braking force for a wheel by performing an operation in which a piston is moved in dependence on a force of an electric motor so as to cause friction members, such as brake pads, to be pressed against a rotary member, such as a disc rotor, that rotates with the wheel. This operation of the electric parking brake device will be hereinafter referred to as "lock operation" or "clamp operation" where appropriate. The temperature of the electric parking brake rises during driving of the vehicle in which a driver sometimes applies brakes. Even if the lock operation is performed to generate the braking force in a state in which the temperature of the electric parking brake device is high, the generated braking force decreases due to a temperature drop thereafter. That is, what is called heat slack occurs. To deal with the heat slack, an electric parking brake device disclosed in Patent Document 1 (Japanese Patent Application Publication No. 2014-19234) is configured to additionally perform the lock operation when a certain time elapses after the lock operation has been performed.

SUMMARY

The electric parking brake disclosed in the Patent Document 1 employs a supply current to the electric motor as an index indicative of the braking force generated by the lock operation. Further, timing of initiation of the re-lock operation (the additional lock operation) is estimated referring to a map that represents a relationship between a lapse of time and an amount of decrease in the braking force. In a case where the temperature when the lock operation is initially performed, namely, the temperature when the parking brake is activated, is considerably high, the lock operation needs to be performed considerably large number of times, undesirably imposing a large load on the electric parking brake device. This problem is one of problems that the electric parking brake device has been experienced. By making improvements to solve some of the problems, the utility of the electric parking brake device, in other words, the utility of a vehicle brake system having an electric parking brake function, can be enhanced. Accordingly, an aspect of the present disclosure is directed to a brake system with high utility.

In one aspect of the present disclosure, a brake system for a vehicle, including:
  a wheel brake device including (a) a rotary member that rotates with a wheel, (b) a friction member configured to be pressed against the rotary member, (c) an actuator including a piston and a working fluid chamber and configured such that the piston is moved forward to cause the friction member to be pressed against the rotary member, the wheel brake device being configured to generate a braking force for the wheel;
  a working-fluid supply device configured to supply a working fluid to the working fluid chamber of the actuator such that a pressure of the working fluid is changeable; and
  a controller configured to control the brake system,
  wherein the actuator further includes an electric motor and a piston moving mechanism configured to move the piston based on an operation of the electric motor,
  wherein the wheel brake device also functions as a parking brake by the operation of the electric motor,
  wherein the controller is configured to execute:
    a normal brake control to control a hydraulic braking force to a magnitude corresponding to a braking request, the hydraulic braking force being a braking force that depends on the pressure of the working fluid supplied to the working fluid chamber; and
    a parking brake control to cause the wheel brake device to be operated as the parking brake, and
  wherein, in the parking brake control, the controller controls the wheel brake device to generate the hydraulic braking force at a start timing of an operation as the parking brake, controls the actuator to perform a lock operation in which the electric motor is operated to move the piston forward in a state in which the hydraulic braking force is generated, and controls the wheel brake device to release the hydraulic braking force after the lock operation.

The actuator is configured to enable the piston to be moved by the pressure of the working fluid and to be moved by the force generated by the electric motor. The brake system according to the present disclosure may be considered as a brake system in which the electric parking brake device is incorporated in a hydraulic brake device, in other words, a brake system in which the hydraulic brake device and the electric parking brake are integrated. The brake system according to the present disclosure is configured such that, in the parking brake control, namely, in the operation as the parking brake, the lock operation is performed in a state in which the hydraulic braking force is generated. That is, in a state in which the vehicle is prevented from starting moving on a hill or the like owing to the hydraulic braking force, the lock operation can be performed after a lapse of a certain length of time from the start timing of the parking brake control, namely, after the temperatures of the friction members, the rotary member, etc., are sufficiently lowered to a certain extent. Thus, the brake system according to the present disclosure can reduce the number of times the lock operation is performed in the operation as the parking brake. It is accordingly possible to reduce the load on the actuator and the load on the wheel brake device.

Various Forms

The parking brake control of the brake system according to the present disclosure includes two modes, for instance. In one of the two modes, the controller controls the actuator to perform the lock operation after the hydraulic braking force having a set magnitude is maintained for a set length of time. This mode will be referred to as a hydraulic-braking-force maintaining mode. In the hydraulic-braking-force maintaining mode, the set length of time (during which the hydraulic braking force is maintained) is made longer, whereby the lock operation can be performed after the temperatures of the friction members, the rotary member, etc., are sufficiently lowered. Thus, one lock operation, for instance, ensures a sufficient braking force in the parking brake with the heat slack taken into consideration. The braking force in the parking brake will be hereinafter referred to as "parking braking force" where appropriate.

In the other of the two modes, the controller prohibits the working fluid from flowing into and out of the working fluid chamber after the hydraulic braking force is generated and controls the actuator to perform the lock operation when the hydraulic braking force is decreased by a set degree. In this mode, the lock operation is performed while monitoring a decrease in the hydraulic braking force due to the heat slack. Accordingly, this mode will be referred to as a hydraulic-braking-force monitor mode. In the hydraulic-braking-force monitor mode, the lock operation can be performed with high reliability before the hydraulic braking force is decreased due to the heat slack to such an extent that the vehicle will probably starts moving. In this mode, the timing at which the lock operation is performed can be optimized, resulting in a decrease in the number of the lock operations.

The hydraulic braking force corresponds to a pressure of the working fluid in the working fluid chamber. (This pressure will be hereinafter referred to as a "fluid-chamber pressure" where appropriate.) Accordingly, the hydraulic braking force may be estimated by detecting the fluid-chamber pressure. Monitoring the hydraulic braking force in the parking brake control may be executed by monitoring the fluid-chamber pressure. Further, the normal brake control (that may be also referred to as "service brake control") may be executed by controlling the fluid-chamber pressure.

In the hydraulic-braking-force monitor mode, the controller may control the actuator to perform the lock operation each time when the hydraulic braking force is decreased by the set degree. In a case where the temperature of the wheel brake device is considerably high or is estimated to be considerably high at the start timing of the parking brake control, for instance, performance of the lock operation a plurality of times is effective. In a case where a plurality of lock operations are performed, the set degree may be same or may be different among the plurality of lock operations.

In the hydraulic-braking-force monitor mode, the controller may determine that leakage of the working fluid supplied to the working fluid chamber is occurring when a decrease gradient of the hydraulic braking force is greater than a set gradient. This determination enables easy detection of a malfunction of the brake system, namely, a malfunction of the working fluid chamber, a malfunction of a fluid passage from the working-fluid supply device to the working fluid chamber, etc.

In any of the hydraulic-braking-force maintaining mode and the hydraulic-braking-force monitor mode of the parking brake control, the controller may control the actuator to additionally perform the lock operation after the hydraulic braking force is released. The lock operation that is additionally performed, i.e., a re-lock operation, ensures the parking braking force with higher reliability. For instance, in the hydraulic-braking-force monitor mode, it may be determined, based on a state of decrease in the hydraulic braking force up to a time point when the hydraulic braking force is released, whether the lock operation should be again performed after releasing the hydraulic braking force, and the lock operation may be performed only when it is determined that the additional lock operation is necessary.

In the parking brake control, the hydraulic braking force generated at the start timing of the operation as the parking brake preferably has a magnitude that surely prevents the vehicle from starting moving. When parking the vehicle on a hill or the like, for instance, the operation as the parking brake starts in a state in which the driver operates a brake operating member such as a brake pedal to a certain extent. Thus, the hydraulic braking force generated at the start timing of the operation as the parking brake is made larger than a hydraulic braking force that is being generated at that time, specifically, larger than a hydraulic braking force that is estimated to be generated in the normal brake control. This configuration allows enough time for execution of the parking brake control.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 9 is a flowchart of the first parking brake control executed in the brake system of the embodiment;

DETAILED DESCRIPTION OF THE EMBODIMENT

Figure 1:
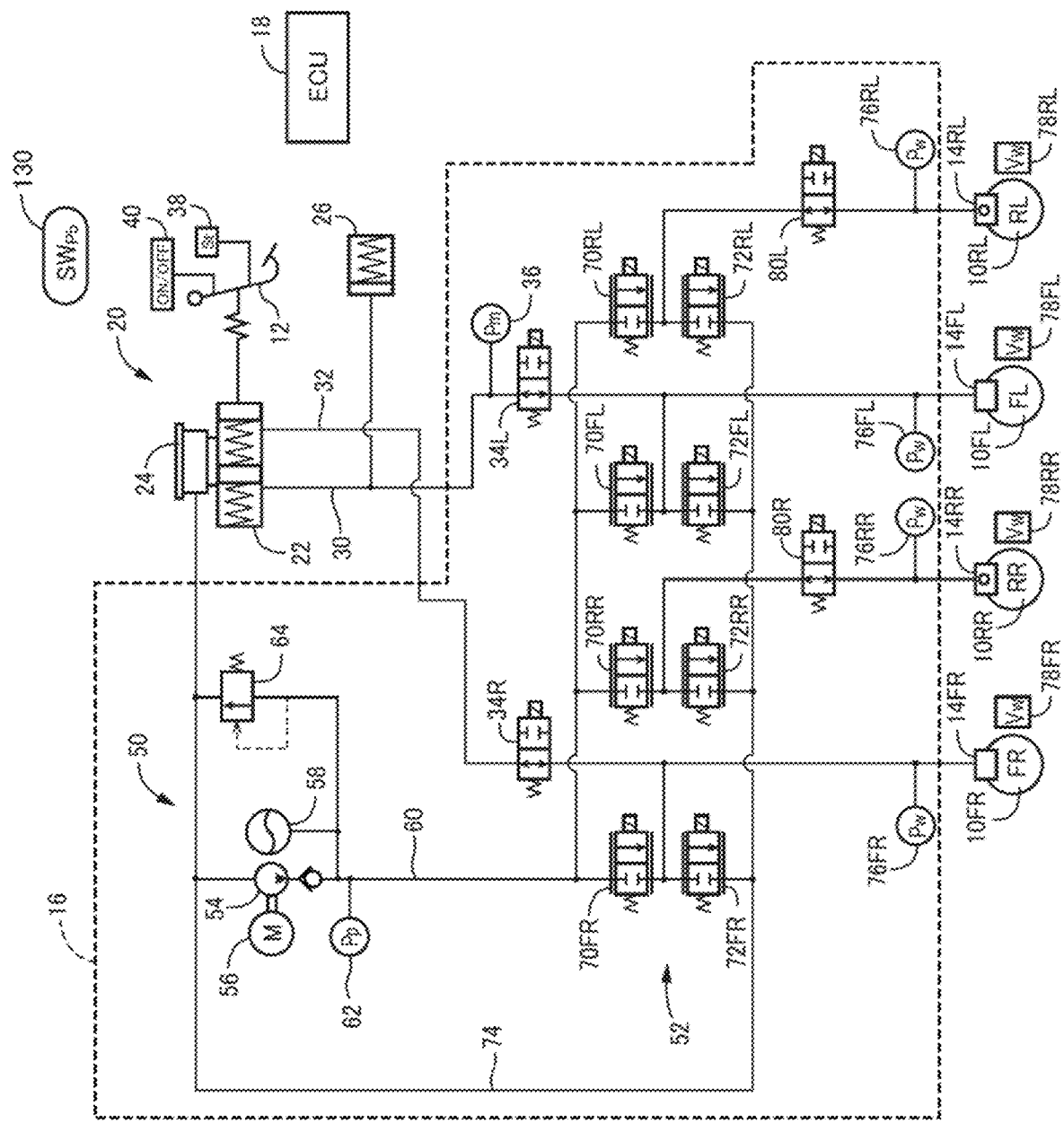
FIG. 1 is a hydraulic circuit diagram of a brake system according to one embodiment.

Referring to the drawings, there will be explained in detail a brake system according to one embodiment of the present disclosure. It is to be understood that the present disclosure is not limited to the details of the following embodiment but may be embodied based on the forms described in Various Forms and may be changed and modified based on the knowledge of those skilled in the art.

A. Overall Configuration of Brake System

As illustrated in FIG. 1, a brake system according to the present embodiment is basically a hydraulic brake system configured to apply a braking force to each of a front left wheel 10FL, a front right wheel 10FR, a rear left wheel 10RL, and a rear right wheel 10RR. The present brake system is an ordinary system except a parking brake function that will be later explained, and an explanation relating to the hydraulic system will be briefly made. In the following explanation, each of the front left wheel 10FL and the front right wheel 10FR will be referred to as a front wheel 10F where appropriate, and each of the rear left wheel 10RL and the rear right wheel 10RR will be referred to as a rear wheel 10R where appropriate. Further, each of the front left wheel 10FL, the front right wheel 10FR, the rear left wheel 10RL, and the rear right wheel 10RR will be referred to as a wheel 10 where appropriate. Further, reference signs of constituent elements corresponding to the front left wheel 10FL, the front right wheel 10FR, the rear left wheel 10RL, and the rear right wheel 10RR, respectively, are suffixed with "FL", "FR", "RL", "RR". Like the wheels 10, each of those components will be referred to in a general term where appropriate.

The brake system includes: a brake pedal 12 as a brake operating member; wheel brake devices 14FL, 14FR, 14RL, 14RR respectively provided for the front left wheel 10FL, the front right wheel 10FR, the rear left wheel 10RL, and the rear right wheel 10RR; a working-fluid supply device 16 configured to supply a working fluid to the wheel brake devices 14 such that a pressure of the working fluid is changeable; and a brake electronic control unit 18 (hereinafter referred to as "brake ECU 18" where appropriate), as a controller, configured to control the brake system.

The brake pedal 12 constitutes part of an operation device 20. The operation device 20 includes: a master cylinder 22 to which the brake pedal 12 is connected; a reservoir 24 attached to the master cylinder 22; and a stroke simulator 26 configured to apply a reaction force to the brake pedal 12 while allowing a pedal stroke corresponding to a depression force that acts on the brake pedal 12. Two fluid passages 30, 32 are connected to the master cylinder 22 so as to pass through the working-fluid supply device 16. The fluid passages 30, 32 are respectively connected to the wheel brake device 14FL of the front left wheel 10FL and the wheel brake device 14FR of the front right wheel 10FR via respective master cut valves 34L, 34R each of which is a normally-open electromagnetic open/close valve. Each of the master cut valves 34L, 34R will be referred to as the master cut valve 34 where appropriate.

The pressure of the working fluid stored in the master cylinder 22, i.e., a master cylinder pressure Pm, is detected by a master pressure sensor 36 provided in the working-fluid supply device 16. The master cylinder pressure Pm will be hereinafter simply referred to as "master pressure Pm" where appropriate. A pedal stroke St, which is a depression amount of the brake pedal 12, namely, which is a brake operation amount, is detected by a stroke sensor 38. Whether the brake pedal 12 is in an operating state is detected by an operation ON/OFF sensor 40 that also functions as a switch of a brake lamp.

The working-fluid supply device 16 includes: a pump device 50 as a high-pressure source; and an electromagnetic valve device 52 configured to supply the working fluid from the pump device 50 to the wheel brake devices 14 at an appropriate pressure.

The pump device 50 includes: a pump 54 configured to pump up the working fluid from the reservoir 24 and to eject the working fluid; a pump motor 56 that is an electric motor for driving the pump 54; and an accumulator 58 provided on an ejection side of the pump 54. The pump device 50 is connected to the electromagnetic valve device 52 via a fluid passage 60. A pump pressure Pp, which is a pressure of the working fluid supplied by the pump device 50, is detected by a pump pressure sensor 62. The pump device 50 is provided with a relief valve 64 configured to release the working fluid to the reservoir 24 that is a low-pressure side in a case where the pressure on the ejection side of the pump 54 is excessively high.

The electromagnetic valve device 52 includes the following control valves so as to correspond to the respective wheels 10, i.e., pressure-increasing control valves 70FL, 70FR, 70RL, 70RR and pressure-reducing control valves 72FL, 72FR, 72RL, 72RR, each of which is configured to control the pressure of the working fluid to be supplied to the wheel brake device 14 of the corresponding wheel 10. The pressure-increasing control valve 70 and the pressure-reducing control valve 72 are connected to each other in series so as to constitute a pair. The four pairs of the control valves are arranged in parallel with each other so as to correspond to the respective wheels 10. Hereinafter, the pressure of the working fluid supplied to each wheel brake device 14 will be referred to as a working fluid pressure or will be referred to as a wheel cylinder pressure Pw because the wheel brake device 14 includes a wheel cylinder. A fluid input port of each pressure-increasing control valve 70 is connected to the fluid passage 60, and a fluid output port of each pressure-reducing control valve 72 is connected to a fluid passage 74 that is connected to the reservoir 24. The fluid output port of each pressure-increasing control valve 70 and the fluid input port of each pressure-reducing control valve 72 are connected to the wheel brake device 14 of the corresponding wheel 10 via a fluid passage. Though not explained in detail, the pressure-increasing control valve 70 and the pressure-reducing control valve 72 are normally-closed electromagnetic linear valves configured to generate a pressure difference between the fluid input side and the fluid output side depending on the amount of the energizing current supplied to each control valve. The supply current to each control valve is controlled to control the wheel cylinder pressure Pw of the corresponding wheel brake device 14, so that the wheel brake device 14 generates an appropriate braking force. The wheel cylinder pressures Pw of the wheel brake devices 14 are detected by wheel cylinder pressure sensors 76FL, 76FR, 76RL, 76RR, respectively.

The wheels 10 are respectively provided with wheel speed sensors 78FL, 78FR, 78RL, 78RR each of which is configured to detect a rotational speed of the corresponding wheel 10, i.e., a wheel rotational speed Vw. The detection values Vw of those sensors are utilized to detect a vehicle speed V that is a running speed of the vehicle and detect slip of any of the wheels 10, for instance.

In the working-fluid supply device 16, shut-off valves 80L, 80R, each of which is a normally-open electromagnetic open/close valve, are provided respectively in two fluid passages that are connected to the two wheel brake devices 14 that correspond to the two rear wheels 10R. The shut-off valves 80L, 80R are configured to close the working fluid chambers of the wheel cylinders of the corresponding two wheel brake devices 14 of the respective two rear wheels 10R.

Though not explained in detail, the brake ECU 18 is constituted by: a computer constituted, for instance, by a CPU, a RAM, a ROM, an input-output interface, and a bus that connects those components; and drive circuits for the pump motor 56, the pressure-increasing control valves 70, and the pressure-reducing control valves 72, etc. There are connected, to the computer, the sensors such as the master pressure sensor 36, the stroke sensor 38, the operation ON/OFF sensor 40, the pump pressure sensor 62, the wheel cylinder pressure sensors 76, and the wheel speed sensors 78 explained above.

B. Configuration of Wheel Brake Device

Figure 2:
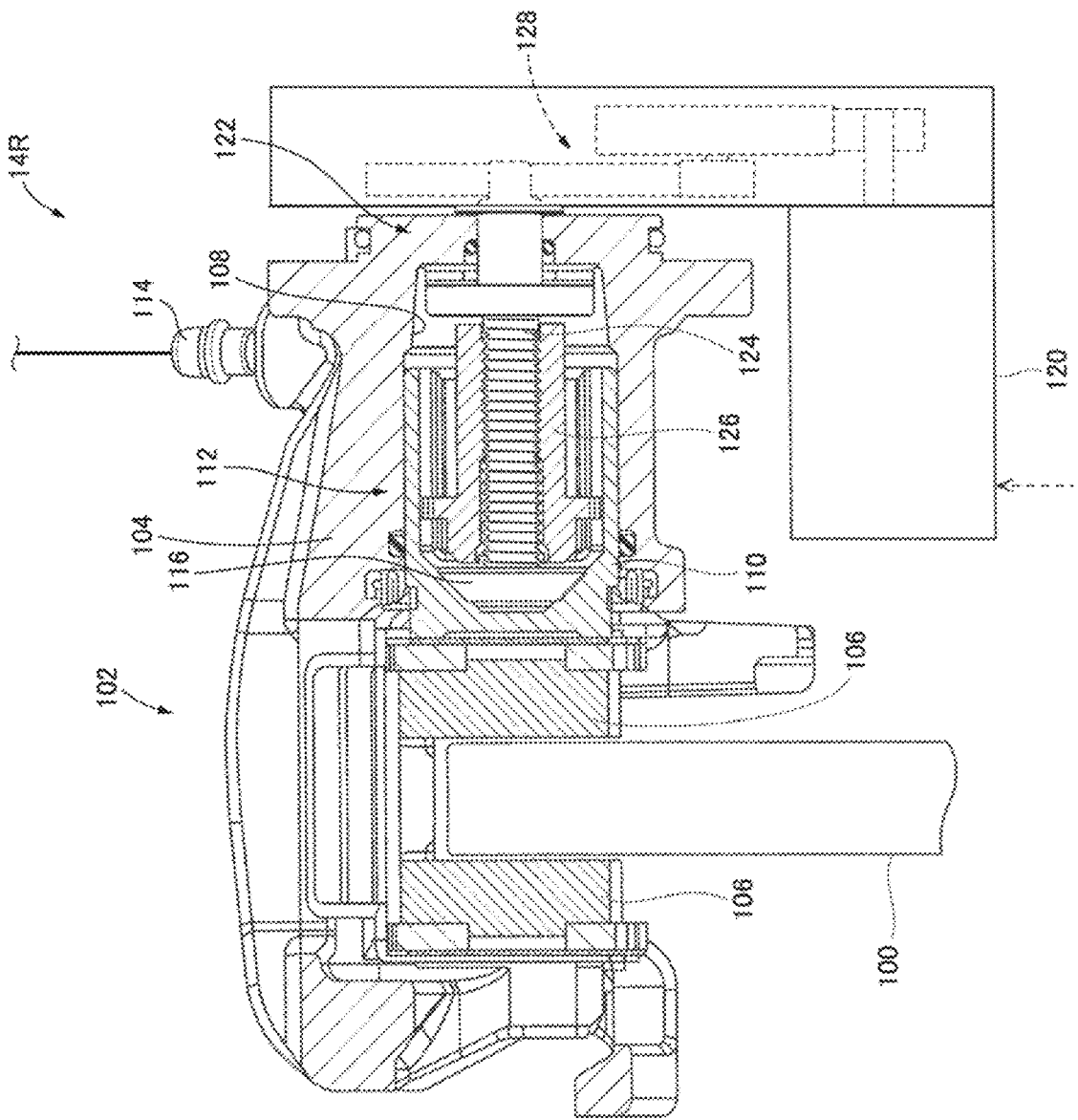
FIG. 2 is a cross-sectional view of a wheel brake device employed in the brake system of the embodiment.

The wheel brake device 14R of each rear wheel 10R will be explained. The wheel brake device 14R is what is called disc brake device. As illustrated in FIG. 2, the wheel brake device 14R includes: a disc rotor 100, as a rotary member, which rotates with the rear wheel 10R; and a brake caliper 102 (that may be considered as an actuator) held by a carrier so as to be movable in a wheel axis direction. The carrier rotatably holds the rear wheel 10R and is allowed to be moved upward and downward relative to the vehicle body.

The brake caliper 102 includes a caliper main body 104. The caliper main body 104 holds a pair of brake pads 106, each as a friction member, configured to be pressed against the disc rotor 100. The brake caliper 102 further includes a piston 110 disposed in a cavity 108 formed in the caliper main body 104. That is, the brake caliper 102 includes a wheel cylinder 112 whose housing is defined by a portion of the caliper main body 104 in which the cavity is formed. There is formed, in the wheel cylinder 112, a working fluid chamber 116 into which the working fluid is supplied from the working-fluid supply device 16 via a port 114. The piston 110 is moved forward by the working fluid in the working fluid chamber 116. When the piston 110 is moved forward, the brake pads 106 are pressed against opposite surfaces of the disc rotor 100, so that the wheel brake device 14R generates a braking force whose magnitude corresponds to the pressing force, namely, a braking force whose magnitude corresponds to the wheel cylinder pressure Pw.

The configuration and the function of the wheel brake device 14R of each rear wheel 10R are identical to those of the wheel brake device 14F of each front wheel 10F, and an explanation of the front brake devices 14F is dispensed with.

The wheel brake device 14R corresponding to each rear wheel 10R also functions as an electric parking brake. Accordingly, the wheel brake device 14R further includes: a parking brake motor 120 (hereinafter referred to as "PB motor 120" where appropriate) that is an electric motor as a drive source for the parking brake; and a piston moving mechanism 122 configured to operate the piston 110, specifically, to move the piston 110 forward, by an operation of the PB motor 120. The piston moving mechanism 122 includes: a threaded rod 124 held by the caliper main body 104 so as to be rotatable and immovable in the axial direction; a nut 126 that is unrotatable and movable in the axial direction and that is threadedly engaged with the threaded rod 124; and a speed reduction mechanism 128 constituted by a gear train configured to decelerate rotation of the PB motor 120 and to transmit the decelerated rotation to the threaded rod 124.

When the PB motor 120 is operated to move the nut 126 forward, the leading end of the nut 126 comes into contact with the inner front end portion of the piston 110, so that the piston 110 moves forward. The forward movement of the piston 110 causes the brake pads 106 to be pressed against the disc rotor 100, whereby the braking force is generated. This braking force has a magnitude corresponding to the amount of the current (the electricity) supplied to the PB motor 120.

In the state in which the brake pads 106 are pressed against the disc rotor 100 by the pressure of the working fluid in the working fluid chamber 116, the brake pads 106 are further pressed against the disc rotor 100 by the torque of the PB motor 120, so that a relatively large braking force can be generated by both the pressing forces, specifically, by the pressing force that is a sum of the pressing force by the pressure of the working fluid in the working fluid chamber 116 and the pressing force by the torque of the PB motor 120. In other words, as long as the wheel brake device 14R is kept in the state in which the brake pads 106 are pressed against the disc rotor 100 by the pressure of the working fluid in the working fluid chamber 116, the braking force required as the parking brake can be obtained by a relatively small torque of the PB motor 120, in other words, the braking force required as the parking brake can be obtained by supplying a relatively small amount of the current to the PB motor 120.

In the state in which the brake pads 106 are pressed against the disc rotor 100 by the torque of the PB motor 120 or by both the torque of the PB motor 120 and the pressure of the working fluid, even if the pressure of the working fluid in the working fluid chamber 116 is reduced and the current stops being supplied to the PB motor 120, the piston 110 is substantially prohibited from moving backward owing to low negative efficiency (reverse efficiency) between the threaded rod 124 and the nut 126 and a large speed reduction ratio of the speed reduction mechanism 128. Thus, the pressing force, namely, the braking force being generated, is maintained.

The brake ECU 18 explained above also includes a drive circuit for the PB motor 120. The brake ECU 18 controls operations of the PB motor 120, that is, the brake ECU 18 controls operations of the parking brake. A parking brake switch 130 (FIG. 1), which is a toggle switch, is provided on an instrument panel in a compartment of the vehicle. The operation of the parking brake switch 130 triggers the parking brake to be operated or canceled.

In the brake system according to the present embodiment, the brake ECU 18 that is a single controller executes: the control of the hydraulic braking force as the braking force that depends on the pressure of the working fluid in the working fluid chamber 116, namely, that depends on the wheel cylinder pressure Pw; and the control of the operations of the PB motor. The control of the hydraulic braking force and the control of the operations of the PB motor may be executed by mutually different electronic control units.

C. Control of Brake System i) Brake Control in Normal Operation

In a normal operation such as when no electric failure occurs and what is called ABS control (antilock control), traction control, etc., are not executed, the brake ECU 18 controls operations of the pump motor 56 such that the pump pressure Pp falls within a set range. The pump control is known in the art, and a detailed explanation thereof is dispensed with. In the normal operation, the brake ECU 18 closes the master cut valves 34 to shut off a flow of the working fluid from the master cylinder 22.

In the normal operation, the hydraulic braking force is controlled by a normal brake control (that may be also referred to as "service brake control"). In the normal brake control, the brake ECU 18 controls, to the magnitude corresponding to a braking request, the hydraulic braking force of each wheel brake device 14, namely, the braking force that depends on the pressure of the working fluid supplied to the working fluid chamber 116 of each wheel brake device 14. Hereinafter, the hydraulic braking force generated in the normal brake control for each wheel 10 will be referred to as "normal braking force" where appropriate.

Specifically, when the brake pedal 12 is operated by the driver, the brake ECU 18 detects the pedal stroke St via the stroke sensor 38, determines a required overall braking force Ft that is required by the vehicle as a whole based on the pedal stroke St, and determines a required wheel braking force Fw that is required by each wheel 10 by distributing the required overall braking force Ft according to a set distribution ratio. Based on the required wheel braking force Fw for each wheel 10, the brake ECU 18 determines, according to a well-known technique, a pressure-increasing energizing current Ii and a pressure-reducing energizing current Id to be supplied to the pressure-increasing control valve 70 and the pressure-reducing control valve 72 for each wheel 10. The brake ECU 18 supplies the determined pressure-increasing energizing current Ii and pressure-reducing energizing current Id to the pressure-increasing control valve 70 and the pressure-reducing control valve 72. Thus, the wheel brake device 14 of each wheel 10 generates the required wheel braking force Fw. Though not explained in detail, in a case where the vehicle is performing automated driving, the hydraulic braking force is controlled based on information on the required overall braking force Ft transmitted from an automated-driving electronic control unit.

In a case where an electric failure is occurring, the master cut valves 34 are opened and each of the two wheel brake devices 14F for the front wheels 10F generates the braking force that depends on the pressure of the working fluid pressurized by the master cylinder 22. Though not explained in detail, when the ABS control or the like is executed, the brake ECU 18 controls the pressure-increasing control valves 70 and the pressure-reducing control valves 72 such that those valves 70, 72 operate in a predetermined manner.

ii) Ordinary Parking Brake Control and Heat Slack and Measure to Address Heat Slack In the parking brake control, the PB motor 120 is operated to move the piston 110 forward, so that the brake pads 106 are pressed against the disc rotor 100 to generate a parking braking force that is a braking force in the parking brake. In the present brake system, the parking brake control is executed for only the two rear wheels 10R.

The wheel braking force, which is the braking force for each wheel 10, has a magnitude that corresponds to the pressing force by which the disc rotor 100 is pressed by the brake pads 106. (The pressing force may be referred to as "clamping force" by the brake pads 106.) The pressing force is balanced with an elastic reaction force that arises from elastic compression of the brake pads 106 being pressed against the disc rotor 100. The parking braking force generated by the forward movement of the piston 110 caused by the PB motor 120 has a magnitude that corresponds to a supply current Ip supplied to the PB motor 120. (This supply current will be hereinafter referred to as "PB current Ip" where appropriate). In this respect, even if the PB current is decreased to 0 after the brake pads 106 once have been pressed, the pressing force is maintained owing to the low negative efficiency (reverse efficiency) of the piston moving mechanism 122 as explained above, so that the parking braking force is maintained.

The parking brake, however, inevitably experiences a phenomenon of "heat slack". The heat slack will be explained referring to FIGS. 3A-3D. In FIGS. 3A-3D, the PB motor 120 and the piston moving mechanism 122 are not illustrated.

Figure 3A:
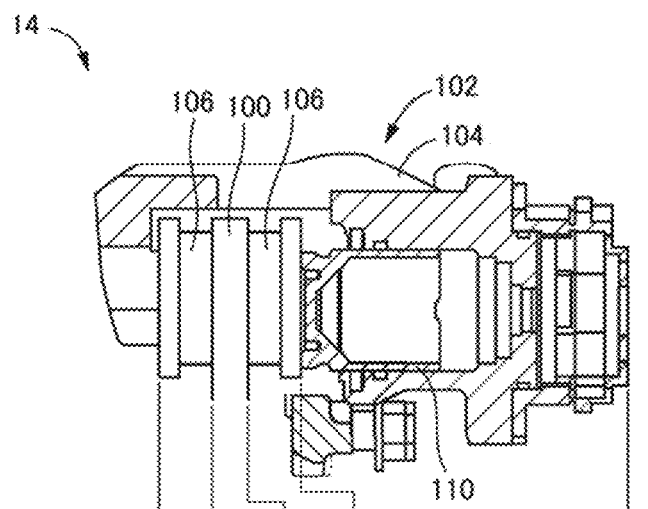
FIG. 3A is a cross-sectional view of the wheel brake device for explaining an occurrence of heat slack.
Figure 3B:
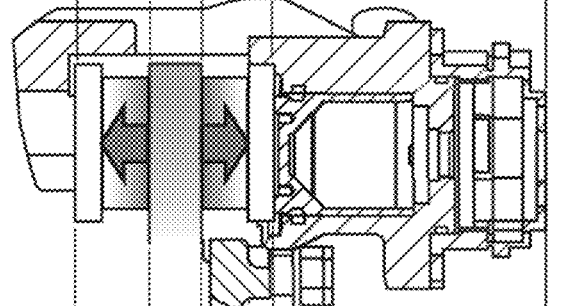
FIG. 3B is a cross-sectional view of the wheel brake device for explaining an occurrence of heat slack.

FIG. 3A illustrates a state in which the temperatures of the brake caliper 102, the disc rotor 100, and the brake pads 106 are low. During driving of the vehicle in which the drive sometimes operates the brake pedal 12, the disc rotor 100 and the brake pads 106 expand due to temperature rise, as illustrated in FIG. 3B. In FIGS. 3A-3D, high-temperature portions are shown in scattered shading.

Figure 3C:
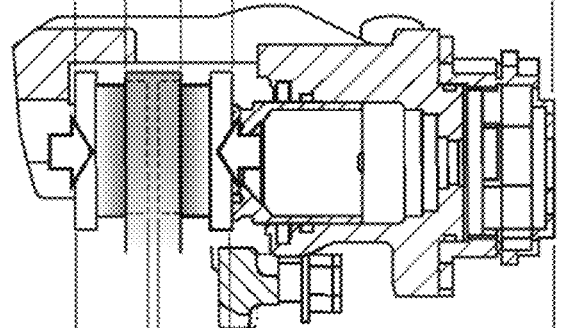
FIG. 3C is a cross-sectional view of the wheel brake device for explaining an occurrence of heat slack.
Figure 3D:
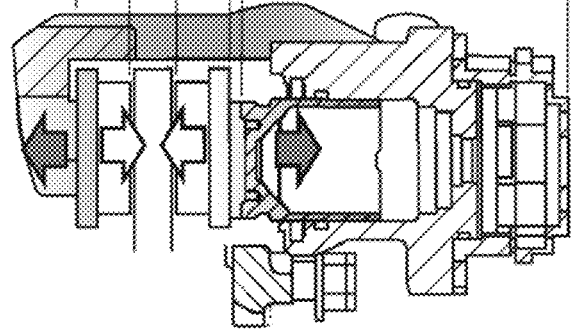
FIG. 3D is a cross-sectional view of the wheel brake device for explaining an occurrence of heat slack.

When the vehicle is stopped and the piston 110 of the brake caliper 102 is moved forward as illustrated in FIG. 3C in a state in which the temperatures of the disc rotor 100 and the brake pads 106 are high, each of the wheel brake devices 14RL, 14RR generates the parking braking force. Thereafter, in the course of cooling down illustrated in FIG. 3D, the temperatures of the disc rotor 100 and the brake pads 106 are lowered by heat dissipation and heat transmission, so that the disc rotor 100 and the brake pads 106 contract while the caliper main body 104 expands due to the received heat. Such a phenomenon causes the heat slack in the course of cooling down of the pads. That is, the elastic compression amount of the brake pads 106 is decreased, and the parking braking force is accordingly decreased by an amount corresponding to the decrease in the elastic compression amount.

Figure 4:
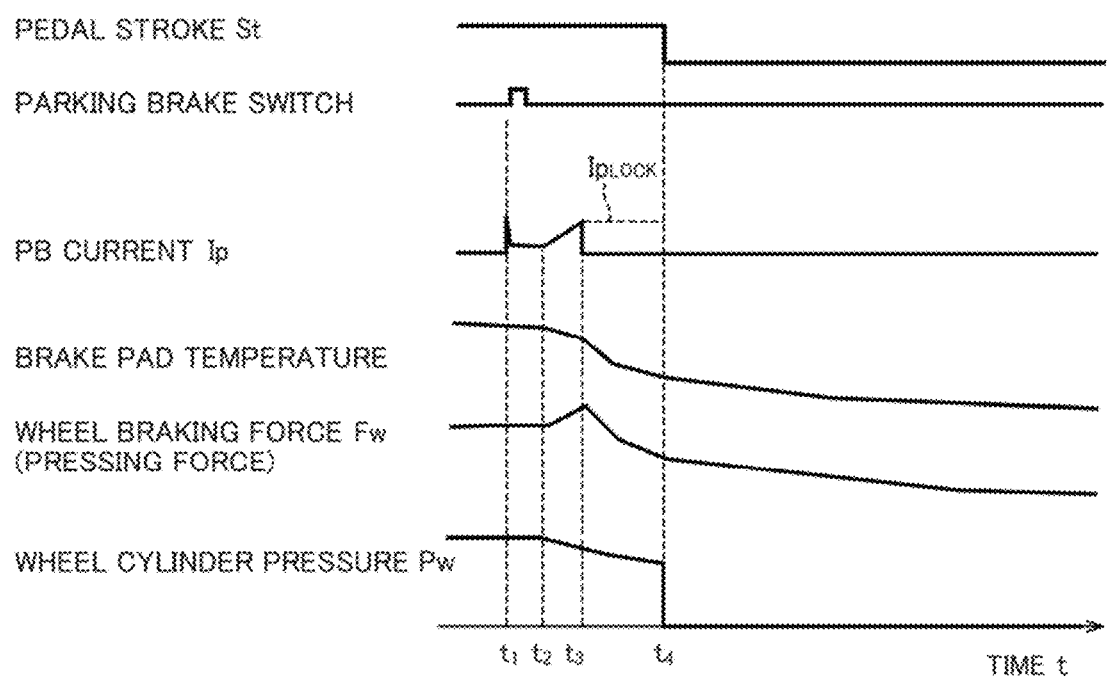
FIG. 4 is a graph for explaining a decrease in a parking braking force due to heat slack.

The decrease in the wheel braking force Fw due to the heat slack will be explained in detail referring to the graph of FIG. 4. In a state in which the brake pedal 12 is depressed to such an extent that the vehicle does not start moving while the vehicle is at a stop, the wheel cylinder pressure Pw has a pressure level that corresponds to the pedal stroke St, and the pressing force that corresponds to the pressure level, namely, the hydraulic braking force, is being generated.

When the parking brake switch 130 is operated at a time point $t_1$, a current Ip is supplied to the PB motor 120 from that time point, the leading end of the nut 126 of the piston moving mechanism 122 comes into contact with the inner front end portion of the piston 110, and the piston 110 is further moved forward. In a case where the PB motor 120 is controlled such that the piston 110 moves forward at a certain speed, for instance, a relatively large PB current Ip is supplied when the nut 126 starts to move. Thereafter, a relatively small PB current Ip is supplied for a length of time (i.e., an idle running time) until the nut 126 comes into contact with the inner front end portion of the piston 110. After the nut 126 comes into contact with the inner front end portion of the piston 110 at a time point $t_2$, the PB current Ip increases proportionally with an increase in the forward movement of the piston 110. Thereafter, the PB current Ip stops being supplied at a time point when the pressing force, namely, the braking force, becomes equal to a set magnitude. Specifically, the PB current Ip stops being supplied at a time point $t_3$ at which the PB current Ip becomes equal to a lock current $Ip_{LOCK}$. The lock current $Ip_{LOCK}$ is a current that allows the piston to stop moving forward. The braking force increases owing to the forward movement of the piston 110 that depends on the force of the PB motor 120, namely, owing to a lock operation. Though not explained in detail, the lock current $Ip_{LOCK}$ may be set so as to be smaller when the hydraulic braking force is being generated than when the hydraulic braking force is not being generated, by an amount corresponding to the hydraulic braking force being generated.

The temperatures of the disc rotor 100, the brake pads 106, etc., (hereinafter will be referred to as "brake pad temperature" for convenience sake) are lowered with a lapse of time, as illustrated in the graph. As the brake pad temperature is lowered, the pressing force, namely, the braking force (specifically, the parking braking force), decreases. This phenomenon is the heat slack experienced in the parking brake.

When the depression operation of the brake pedal ends at a time point $t_4$, the wheel cylinder pressure Pw is reduced to atmospheric pressure and the hydraulic braking force becomes equal to 0. Owing to the low negative efficiency (reverse efficiency) of the piston moving mechanism 122, however, the pressing force at that time point is maintained and the parking braking force at that time point is maintained.

To address the heat slack described above, the brake system of the present embodiment is configured such that, in the parking brake control, the hydraulic braking force is generated at a start timing of the operation as the parking brake irrespective of whether the driver is operating the brake pedal 12, in other words, without depending on the pedal stroke St, and the operation in which the electric motor is operated to move the piston, i.e., the lock operation, is performed in the state in which the hydraulic braking force is being generated. Further, after the lock operation, the hydraulic braking force is released. That is, in the brake system of the present embodiment, the lock operation is performed while a certain degree of the braking force is held owing to the wheel cylinder pressure Pw, in other words, while a hydraulic brake hold is being performed. Here, the hydraulic brake hold means that the wheel is kept prevented from being rotating by the hydraulic braking force.

The parking brake control executed in the brake system of the present embodiment may employ any of some concrete controls. Those controls are broadly classified into two modes. One of the two modes is a mode in which the lock operation is performed after the hydraulic braking force having a set magnitude is maintained for a set length of time. (This mode may be referred to as "hydraulic-braking-force maintaining mode".) The other of the two modes is a mode in which the working fluid is prohibited from flowing into and out of the working fluid chamber 116 after the hydraulic braking force is generated, and the lock operation is performed when the hydraulic braking force is decreased by a set degree. (This mode may be referred to as "hydraulic-braking-force monitor mode".) Hereinafter, some of concrete controls that are employable will be explained.

iii) First Parking Brake Control

A first parking brake control is a control in the hydraulic-braking-force maintaining mode. The brake ECU 18 executes the first parking brake control in place of the normal brake control when the parking brake switch 130 is operated. Referring to the graph of FIG. 5, the first parking brake control will be explained. In the first parking brake control, at a time point $t_{11}$ at which the parking brake switch 130 is operated, the brake ECU 18 determines, according to a technique similar to that in the normal brake control, the pressure-increasing energizing current Ii and the pressure-reducing energizing current Id to be supplied to the pressure-increasing control valve 70 and the pressure-reducing control valve 72 of the working-fluid supply device 16, such that the wheel braking force Fw becomes equal to a hold braking force $Fw_H$. The brake ECU 18 supplies the determined energizing currents Ii, Id to the pressure-increasing control valve 70 and the pressure-reducing control valve 72.

Figure 5:
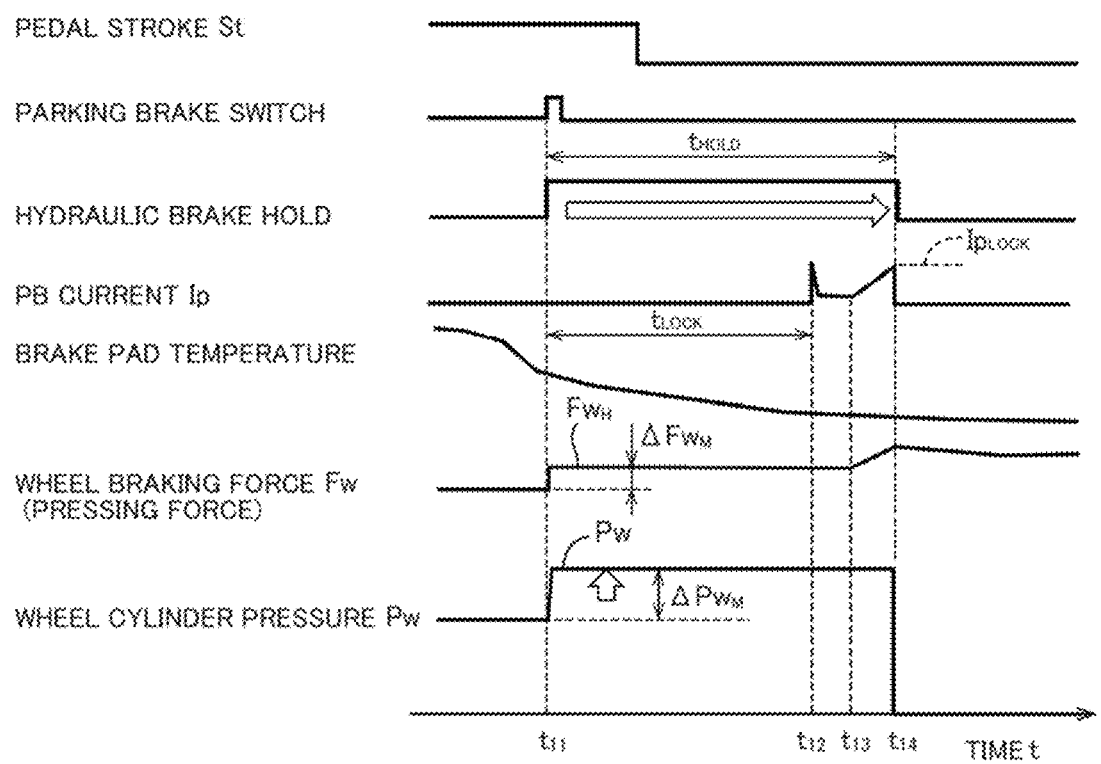
FIG. 5 is a graph for explaining a change in the parking braking force when a first parking brake control is executed.

In the graph of FIG. 5, it is shown that a typical magnitude of the hydraulic braking force (that is estimated to be generated in the normal brake control based on the operation of the brake pedal 12 by the driver) is generated at the start timing of the operation as the parking brake. This hydraulic braking force will be hereinafter referred to as "start-timing normal braking force" where appropriate. The hold braking force $Fw_H$ is set so as to be larger than the start-timing normal braking force by a set margin $\Delta Fw_M$. Similarly, the wheel cylinder pressure Pw is larger by a margin $\Delta Pw_M$ corresponding to the margin $\Delta Fw_M$. The start-timing normal braking force is the estimated typical magnitude of the braking force, and the hold braking force $Fw_H$ is the wheel braking force Fw having a fixed magnitude set in advance. For instance, the hold braking force $Fw_H$ may be determined as follows. That is, the hydraulic braking force being actually generated at the start timing of the operation as the parking brake is identified based on the wheel cylinder pressure Pw, and the hold braking force $Fw_H$ is determined based on the identified hydraulic braking force.

When a set length of time, i.e., a lock wait time $t_{LOCK}$, elapses after the start timing of the operation as the parking brake, namely, at a time point $t_{12}$, the brake ECU 18 causes the lock operation to be performed. In the lock operation, the brake ECU 18 issues a command to cause the PB motor 120 to be rotated to thereby move the piston 110 forward at a set speed. Specifically, the brake ECU 18 issues a command to cause the nut 126 of the piston moving mechanism 122 to move forward at the set speed. After a lapse of the idle running time described above, the PB motor 120 rotates at a relatively low rotational speed dθ, and the piston 110 moves forward at a relatively low speed, from a time point $t_{13}$. The PB current Ip increases in accordance with the forward movement. When the rotational speed dθ of the PB motor 120 is not higher than a threshold speed $dθ_{TH}$ and the PB current Ip becomes equal to the lock current $Ip_{LOCK}$ that is a current for ending the lock operation, namely, at a time point $t_{14}$, the brake ECU 18 stops supplying the current to the PB motor 120. It is noted that the lock current $Ip_{LOCK}$ is set to have an amount that enables a sufficient parking braking force to be obtained.

After the lock operation, and more specifically, at a time point $t_{14}$ at which the lock operation is completed, the brake ECU 18 stops supplying the energizing currents Ii, Id to the pressure-increasing control valve 70 and the pressure-reducing control valve 72, so as to release the hydraulic braking force. The hydraulic braking force is maintained at the set magnitude for the lock wait time $t_{LOCK}$, and more specifically, from the time point $t_{11}$ to the time point $t_{13}$. In this respect, the length of time from the time point $t_{11}$ to the time point $t_{14}$ is a length of time during which the hydraulic braking force is generated, i.e., a hydraulic-brake hold time $t_{HOLD}$.

In the first parking brake control, the lock operation is performed in a state in which the hydraulic braking force is maintained at a constant magnitude, as apparent from the graph. A relatively long lock wait time $t_{LOCK}$ enables a sufficient parking braking force to be maintained by one lock operation without detecting the brake pad temperature after the one lock operation is performed, even when the heat slack occurs. A temperature sensor for detecting the brake pad temperature may be provided, and the lock operation may be started based on the brake pad temperature detected via the temperature sensor when the detected temperature is lowered to a set temperature.

iv) Second Parking Brake Control

Figure 6A:
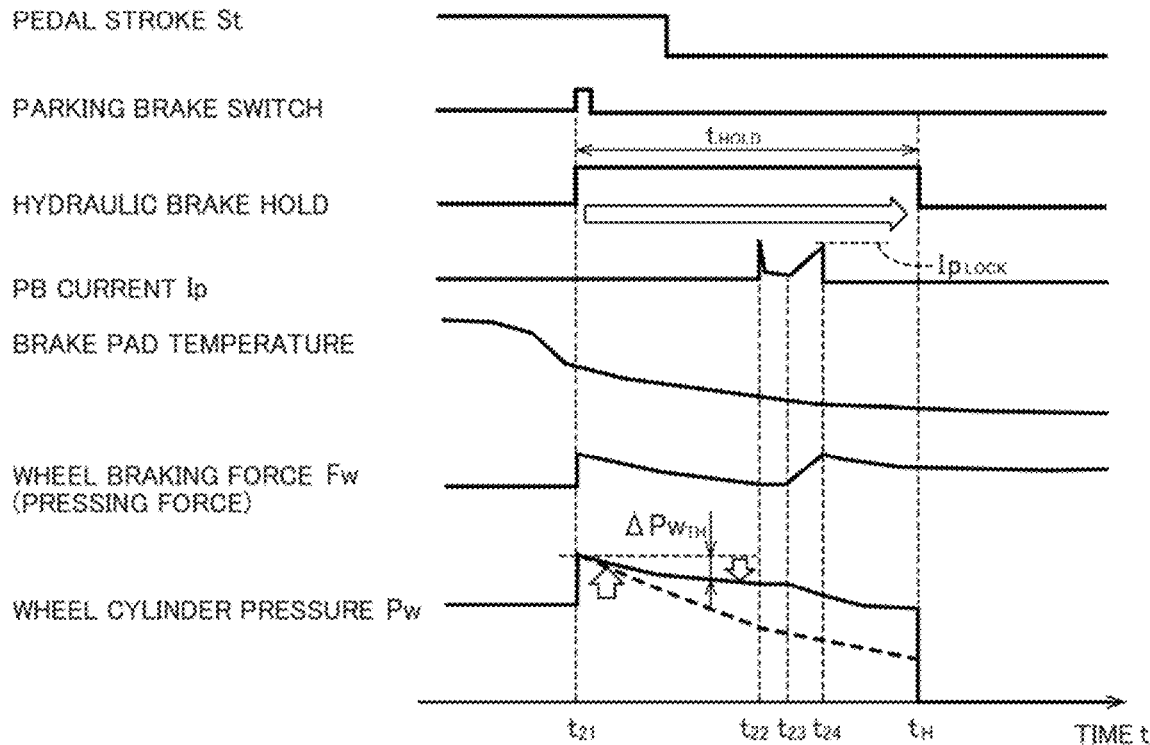
FIG. 6A is a graph for explaining a change in the parking braking force when a second parking brake control is executed.

The second parking brake control is a control in the hydraulic-braking-force monitor mode. The brake ECU 18 executes the second parking brake control in place of the normal brake control when the parking brake switch 130 is operated. Referring to the graph of FIG. 6A, the second parking brake control will be explained. In the second parking brake control, at a time point $t_{21}$ at which the parking brake switch 130 is operated, the brake ECU 18 determines, according to a technique similar to that in the normal brake control, the pressure-increasing energizing current Ii and the pressure-reducing energizing current Id to be supplied to the pressure-increasing control valve 70 and the pressure-reducing control valve 72 of the working-fluid supply device 16 such that the wheel braking force Fw becomes equal to the hold braking force $Fw_H$, as in the first parking brake control. The brake ECU 18 supplies the determined energizing currents Ii, Id to the pressure-increasing control valve 70 and the pressure-reducing control valve 72.

Unlike in the first parking brake control, the brake ECU 18 detects the wheel cylinder pressure Pw via the wheel cylinder pressure sensor 76 in the second parking brake control. When the wheel cylinder pressure Pw becomes equal to a target wheel cylinder pressure Pw* that corresponds to the required wheel braking force Fw, that is, immediately after the time point $t_{21}$ at which the parking brake switch 130 is operated, the brake ECU 18 closes the shut-off valve 80 and closes the working fluid chamber 116 of the wheel cylinder 112 for the hydraulic-brake hold time $t_{HOLD}$, namely, till a time point $t_H$. By thus closing the working fluid chamber 116, the hydraulic braking force is generated for the hydraulic-brake hold time $t_{HOLD}$.

While closing the working fluid chamber 116, the brake ECU 18 detects a reduction degree ΔPw by which an actual wheel cylinder pressure Pw is reduced from the target wheel cylinder pressure Pw* that is the wheel cylinder pressure Pw when the working fluid chamber 116 is closed. When the reduction degree ΔPw becomes greater than or equal to a threshold degree $\Delta Pw_{TH}$, namely, at a time point $t_{22}$, the lock operation is performed. That is, when the hydraulic braking force is decreased by the set degree, the lock operation is performed. The brake ECU 18 determines the lock current $Ip_{LOCK}$ in the lock operation based on the target wheel cylinder pressure Pw*, namely, based on the wheel cylinder pressure Pw when the working fluid chamber 116 is closed.

Figure 6B:
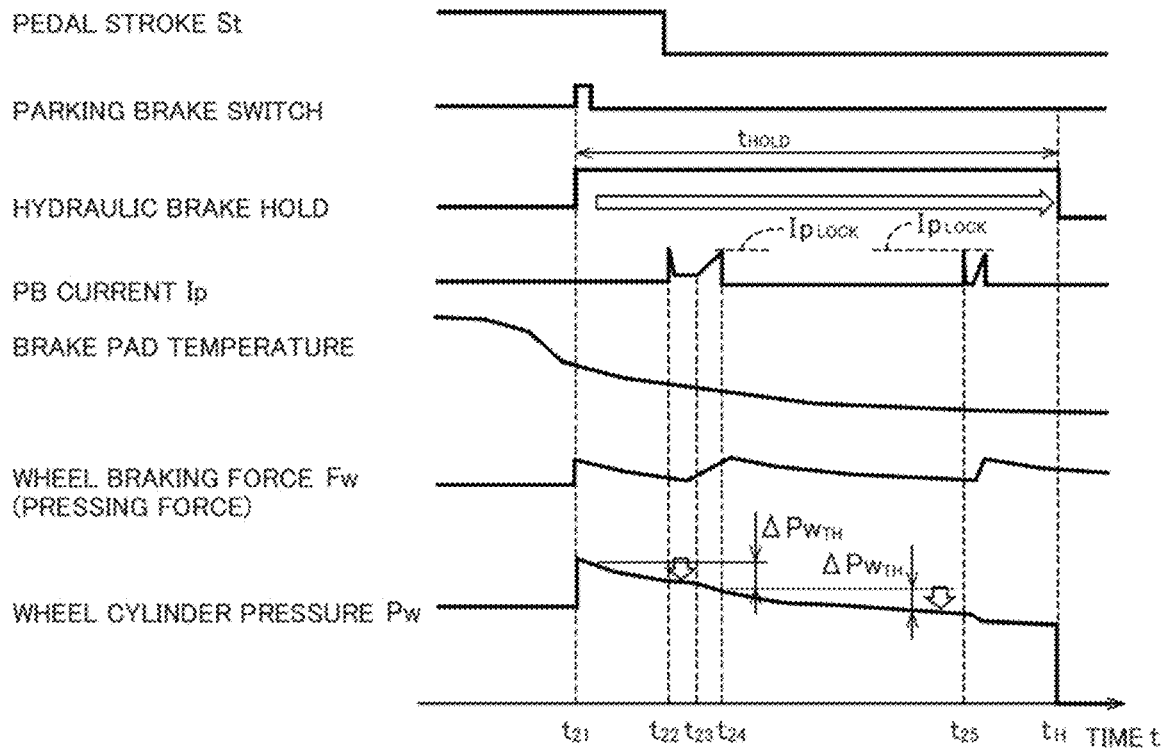
FIG. 6B is another graph for explaining a change in the parking braking force when the second parking brake control is executed.

The brake ECU 18 determines the hydraulic-brake hold time $t_{HOLD}$ to be a length of time in which at least one lock operation is performed. In a case where the brake pad temperature at the start timing of the operation as the parking brake is considerably high, for instance, the hydraulic-brake hold time $t_{HOLD}$ may be determined to be a relatively long length of time in which the lock operation is performed a plurality of times. That is, the lock operation may be performed each time when the hydraulic braking force is decreased by a set degree. FIG. 6B is a graph in a case in which the hydraulic-brake hold time $t_{HOLD}$ is determined to be a length of time in which the lock operation is performed twice. The graph shows that the second lock operation is started at a time point $t_{25}$.

In a case where the lock operation is performed a plurality of times, the reduction degree ΔPw, which is a parameter for determining a timing of starting the second and subsequent lock operations, may be determined as a difference between the wheel cylinder pressure Pw when preceding lock operation has ended and the wheel cylinder pressure Pw at the present time. The threshold degree $\Delta Pw_{TH}$ may take on mutually different values for the respective lock operations that are performed a plurality of times. Similarly, the lock current $Ip_{LOCK}$ may take on mutually different values for the respective lock operations that are performed a plurality of times.

In the second parking brake control, the brake ECU 18 monitors the wheel cylinder pressure Pw. In a case where a decrease gradient d|Pw| of the wheel cylinder pressure Pw is great in the hydraulic-brake hold time $t_{HOLD}$ as indicated by the dashed line FIG. 6A, the brake ECU 18 determines that leakage of the working fluid is occurring in the working fluid chamber 116 or the like. Specifically, when the decrease gradient d|Pw| is greater than or equal to a fluid-leakage determination gradient $dPw_{LEAK}$, the occurrence of the fluid leakage is identified.

v) Third Parking Brake Control

The third parking brake control is executed by the brake ECU 18 in place of the normal brake control when the parking brake switch 130 is operated. In the third parking brake control, the brake ECU 18 performs one lock operation in the hydraulic-brake hold time $t_{HOLD}$, and further performs an additional lock operation after the hydraulic brake hold is canceled. Specifically, the brake ECU 18 performs one more lock operation, namely, a re-lock operation, after the second parking brake control.

Figure 7:
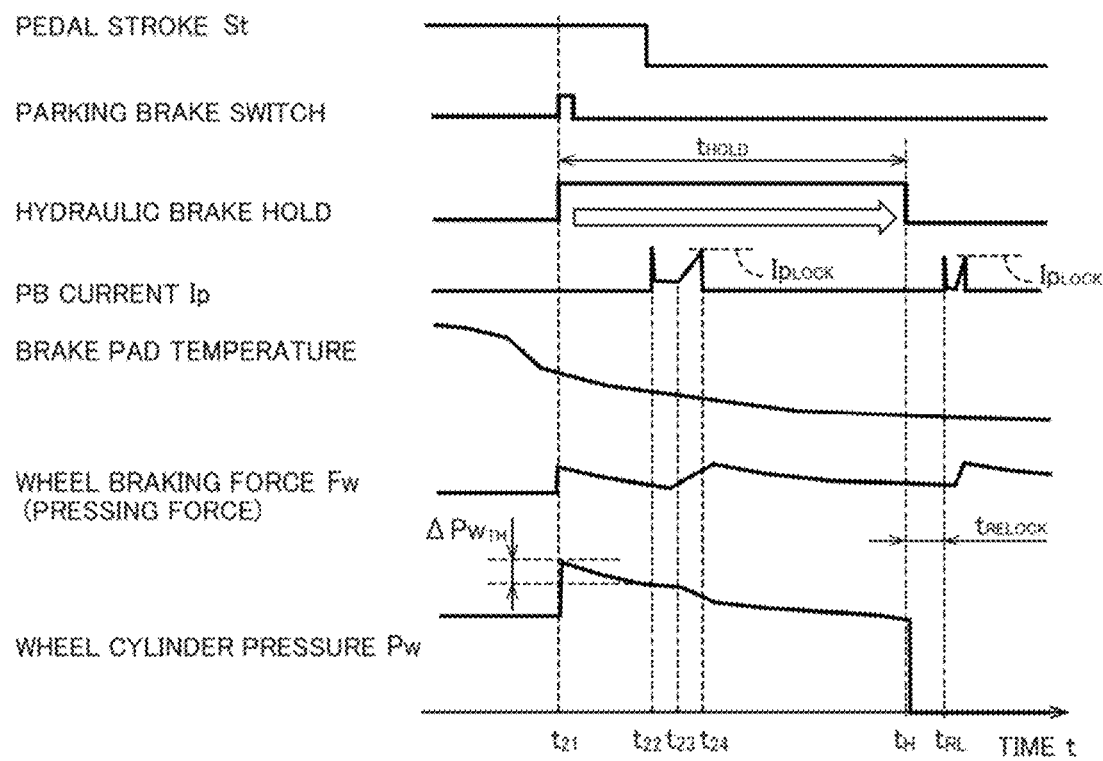
FIG. 7 is a graph for explaining a change in the parking braking force when a third parking brake control is executed.

FIG. 7 is a graph in a case in which one lock operation is performed in the hydraulic-brake hold time $t_{HOLD}$, and an additional lock operation, namely, a re-lock operation, is performed after the hydraulic brake hold is canceled. Referring to FIG. 7, the third parking brake control will be explained. The brake ECU 18 stores a history of changes of the wheel cylinder pressure Pw in the hydraulic-brake hold time $t_{HOLD}$ in the second parking brake control. When the hydraulic-brake hold time $t_{HOLD}$ elapses, the brake ECU 18 determines, based on the history, a re-lock wait time $t_{RELOCK}$ for which the brake ECU 18 waits before the re-lock operation is started. The brake ECU 18 determines the lock current $Ip_{LOCK}$ in the re-lock operation in consideration of the fact that the re-lock operation is the lock operation in a state in which the hydraulic brake hold is not being performed. The brake ECU 18 performs, based on the determined lock current $Ip_{LOCK}$, the re-lock operation at a time point $t_{RL}$ at which the re-lock wait time $t_{RELOCK}$ elapses from a time point of cancellation of the hydraulic brake hold, i.e., from a time point $t_H$. After the re-lock operation is performed, the operation as the parking brake in the third parking brake control is ended.

In the third parking brake control, the re-lock operation is performed after the control in the hydraulic-braking-force monitor mode, that is, after the second parking brake control. The re-lock operation may be performed after the control in the hydraulic-braking-force maintaining mode such as the first parking brake control.

vi) Control Flow

Figure 8:
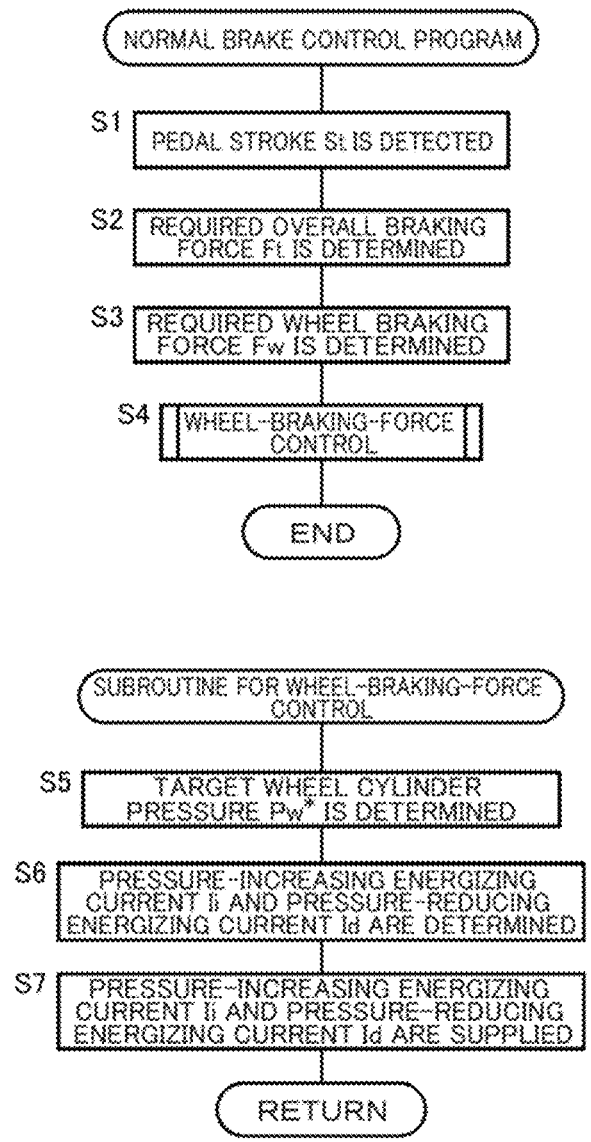
FIG. 8 is a flowchart of a normal brake control executed in the brake system of the embodiment.

The brake ECU 18 repeatedly executes a normal brake control program represented by a flowchart of FIG. 8 at a short time pitch, e.g., from several to several tens of milliseconds (msec), so that the normal brake control is executed. Further, the brake ECU 18 repeatedly executes a first-parking-brake control program, a second-parking-brake control program, and a third-parking-brake control program respectively represented by flowcharts of FIG. 9-11, each at a short time pitch, e.g., from several to several tens of milliseconds (msec), so that the first-third parking brake controls are executed. Referring to the flowcharts, there will be hereinafter briefly explained the flow of the process according to each program.

vi-a) Normal Brake Control

In the process according to the normal brake control program represented by the flow chart of FIG. 8, the pedal stroke St is detected at Step 1 via the stroke sensor 38 as a degree of the braking request. (Step 1 will be hereinafter abbreviated as "S1". Other steps will be similarly abbreviated.) At S2, the required overall braking force Ft, which is the braking force required by the vehicle as a whole, is determined based on the detected pedal stroke St. At S3, the required overall braking force Ft is distributed according to the set distribution ratio, so that the required wheel braking force Fw, which is the braking force required by each wheel 10, is determined.

At S4, a subroutine for a wheel-braking-force control is executed for each wheel 10. The subroutine starts with S5 at which the target wheel cylinder pressure Pw*, which is a target of the wheel cylinder pressure Pw, is determined based on the required wheel braking force Fw determined as described above. The wheel cylinder pressure Pw is the pressure of the working fluid supplied from the working-fluid supply device 16 to the working fluid chamber 116 of the brake caliper 102 corresponding to each wheel 10. The control flow then proceeds to S6 to determine, based on the determined target wheel cylinder pressure Pw*, the pressure-increasing energizing current Ii and the pressure-reducing energizing current Id to be supplied to the pressure-increasing control valve 70 and the pressure-reducing control valve 72 in the working-fluid supply device 16 corresponding to each wheel 10. At S7, the pressure-increasing energizing current Ii and the pressure-reducing energizing current Id are respectively supplied to the pressure-increasing control valve 70 and the pressure-reducing control valve 72.

vi-b) First Parking Brake Control

In the process according to the first-parking-brake control program represented by the flowchart of FIG. 9, a time counter t is incremented at S11 by a count-up time Δt that corresponds to the time pitch at which the program is executed. At S12, the required wheel braking force Fw is determined to be the hold braking force $Fw_H$ that is the hydraulic braking force to be maintained in the hydraulic brake hold. At S13, the subroutine for the wheel-braking-force control represented by the flowchart of FIG. 8 is executed, and the hold braking force $Fw_H$ is maintained until the lock wait time $t_{LOCK}$ elapses.

At S14, it is determined whether the time counter t has reached the lock wait time $t_{LOCK}$. When it is determined that the lock wait time $t_{LOCK}$ has not yet reached the lock wait time $t_{LOCK}$, S11-S13 are repeated. When it is determined that the time counter t has reached the lock wait time $t_{LOCK}$, the lock operation is performed at S15 by execution of a subroutine for a lock operation.

In the process according to the subroutine for the lock operation, a command for moving the piston 110 of the brake caliper 102 forward is issued at S21. Specifically, this command is issued to the PB motor 120 for moving the nut 126 of the piston moving mechanism 122 forward at the set speed. At S22, it is determined whether the motor rotational speed dθ, which is the rotational speed of the PB motor 120, is not higher than the threshold speed $dθ_{TH}$. When it is determined that the motor rotational speed dθ is higher than the threshold speed $dθ_{TH}$, the lock operation is continued. When it is determined that the motor rotational speed dθ is not higher than the threshold speed $dθ_{TH}$, in other words, when it is determined that the speed of the forward movement of the piston 110 is a relatively low, it is determined at S23 whether the PB current Ip, which is the supply current to the PB motor 120, has reached the lock current $Ip_{LOCK}$. The lock current $Ip_{LOCK}$ is set such that a sufficient parking braking force is obtained. When it is determined that the PB current Ip has not yet reached the lock current $Ip_{LOCK}$, the lock operation is continued.

When the PB current Ip reaches the lock current $Ip_{LOCK}$, a forward-movement end process is executed at S16 of the first-parking-brake control program. In the forward-movement end process, the PB current Ip is made equal to 0 for ending the forward movement of the piston 110. At S17, an end process for ending the first parking brake control is executed. In the end process, the pressure-increasing energizing current Ii and the pressure-reducing energizing current Id are made equal to 0, and the time counter t is reset. After the end process, the first parking brake control is ended.

vi-c) Second Parking Brake Control

Figure 10:
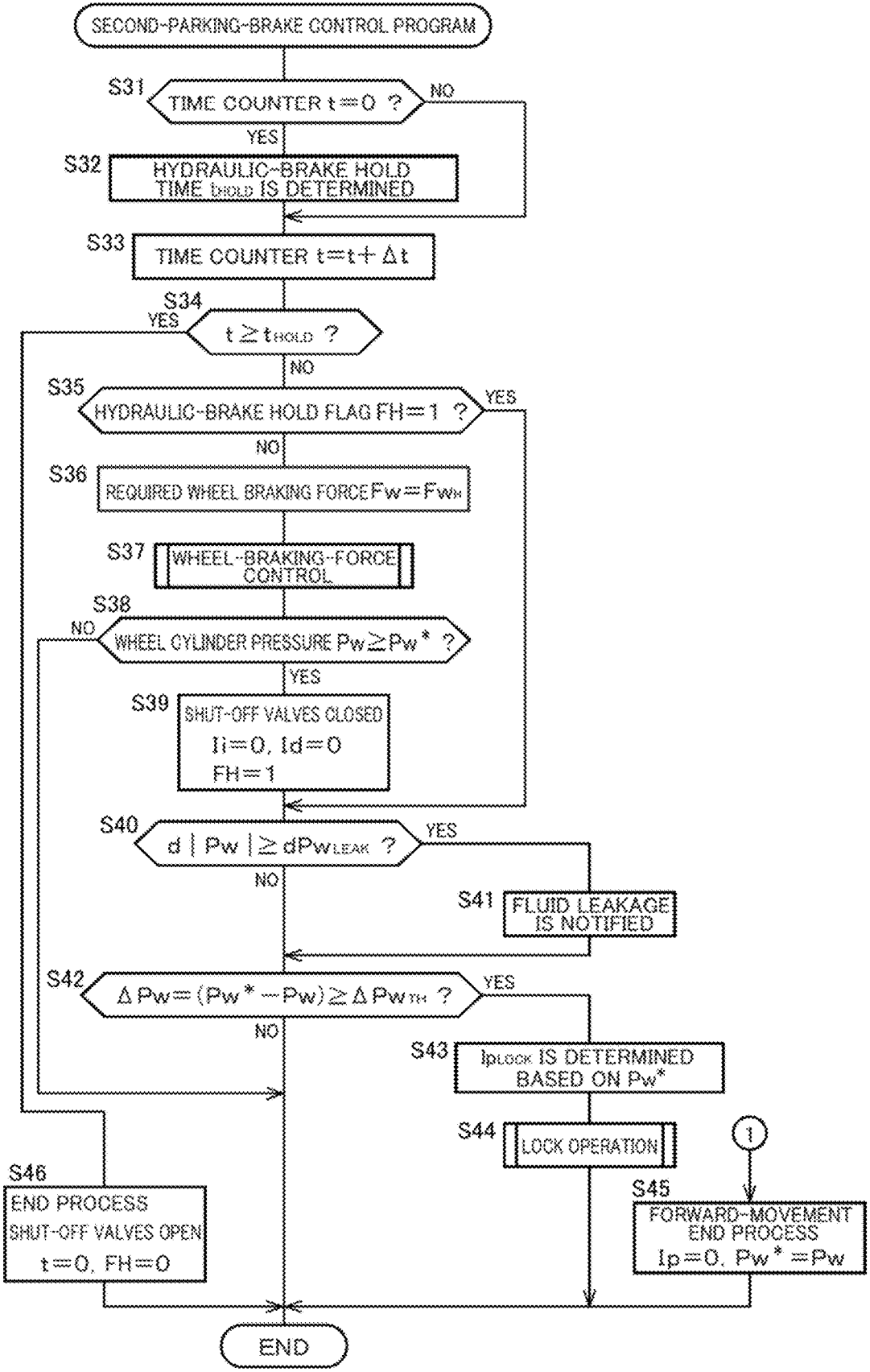
FIG. 10 is a flowchart of the second parking brake control executed in the brake system of the embodiment.

In the process according to the second-parking-brake control program represented by the flowchart of FIG. 10, it is determined at S31 whether the time counter t is 0. When the time counter t is 0, in other words, when the program is executed for the first time, the hydraulic-brake hold time $t_{HOLD}$ during which the hydraulic brake hold is performed is determined at S32 based on the driving state of the vehicle, the brake pad temperature, etc. At S33, the time counter t is incremented by the count-up time Δt. At S34, it is determined whether the time counter t has reached the hydraulic-brake hold time $t_{HOLD}$.

When the time counter t has not yet reached the hydraulic-brake hold time $t_{HOLD}$, it is determined at S35 whether a value of a hydraulic-brake hold flag FH is 1 or 0. The hydraulic-brake hold flag FH is a flag whose value is set to "1" when the hydraulic brake hold is being performed and set to "0" when the hydraulic brake hold is not being performed. When the hydraulic brake hold is not being performed, the required wheel braking force Fw is determined to be the hold braking force $Fw_H$ at S36, and the subroutine for the wheel-braking-force control represented by the flowchart of FIG. 8 is executed at S37, as in the process according to the first parking brake control. At S38, it is determined whether the wheel cylinder pressure Pw has become equal to the target wheel cylinder pressure Pw*. When the wheel cylinder pressure Pw has not yet become equal to the target wheel cylinder pressure Pw*, the subroutine for the wheel-braking-force control is continued in next execution of the program. On the other hand, when the wheel cylinder pressure Pw has become equal to the target wheel cylinder pressure Pw*, the control flow proceeds to S39 at which the working fluid chamber 116 is closed, the pressure-increasing energizing current Ii and the pressure-reducing energizing current Id are determined to be 0, and the value of the hydraulic-brake hold flag FH is set to "1". When it is determined at S35 that the hydraulic brake hold is being performed, S36-S39 are skipped.

In a state in which the hydraulic brake hold is being performed, it is determined at S40 whether the decrease gradient d|Pw| of the wheel cylinder pressure Pw is not less than the fluid-leakage determination gradient $dPw_{LEAK}$. When the decrease gradient d|Pw| is not less than the fluid-leakage determination gradient $dPw_{LEAK}$, the control flow proceeds to S41 at which the driver is notified through a notifying device provided on the instrument panel that leakage of the working fluid is occurring in the working fluid chamber 116, etc.

At S42, it is determined whether the reduction degree ΔPw of the wheel cylinder pressure Pw has become equal to the threshold degree $ΔPw_{TH}$. The reduction degree ΔPw is obtained by subtracting the wheel cylinder pressure Pw at the present time from the target wheel cylinder pressure Pw*. When the reduction degree ΔPw has not yet become equal to the threshold degree $ΔPw_{TH}$, one execution of the program is ended. When the reduction degree ΔPw has become equal to the threshold degree $ΔPw_{TH}$, the lock current $Ip_{LOCK}$ is determined at S43 based on the target wheel cylinder pressure Pw*. At S44, the subroutine for the lock operation represented by the flowchart of FIG. 9 is executed. In a case where the lock operation should be ended during execution thereof, the forward-movement end process for the piston 110 is executed at S45 in which the PB current Ip is made equal to 0, as in the process according to the first-parking-brake control program. In the second parking brake control, the target wheel cylinder pressure Pw* is replaced, in the forward-movement end process, with the wheel cylinder pressure Pw at that time, that is, the wheel cylinder pressure Pw at the end timing of the lock operation.

When it is determined at S34 that the time counter t has reached the hydraulic-brake hold time $t_{HOLD}$, an end process is executed at S46 for ending the second parking brake control. In the end process, the shut-off valve 80 is opened, and the time counter t and the hydraulic-brake hold flag FH are reset. After the end process, the second parking brake control is ended.

i-d) Third Parking Brake Control

Figure 11:
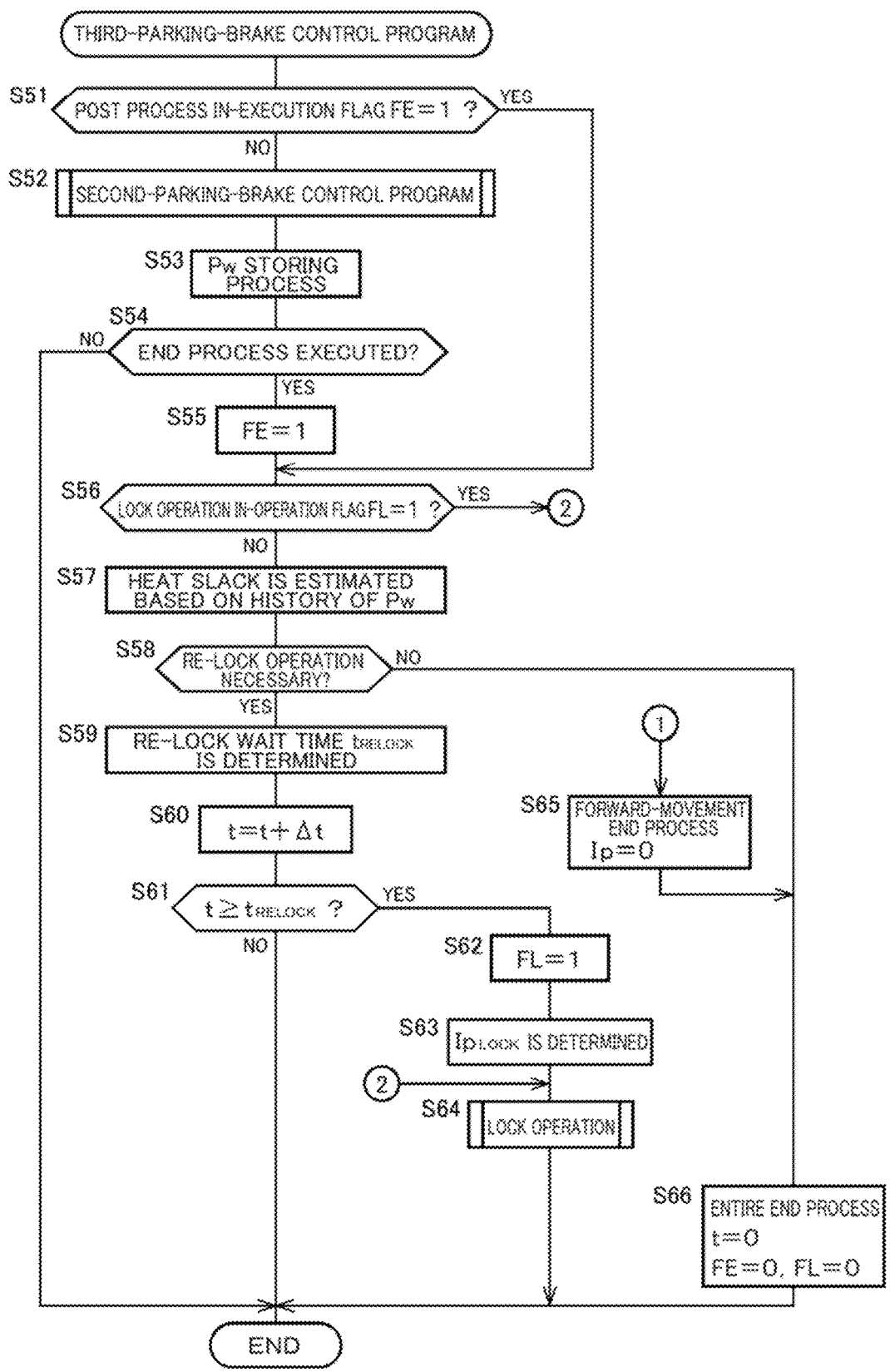
FIG. 11 is a flowchart of the third parking brake control executed in the brake system of the embodiment.

In the process according to the third-parking-brake control program represented by the flowchart of FIG. 11, it is determined at S51 whether a value of a post process in-execution flag FE is 1 or 0. In the third parking brake control, the process according to the second-parking-brake control program, that is, the second parking brake control, is executed, and a post process that involves the lock operation is executed after the second parking brake control has been ended. The post process in-execution flag FE is a flag whose value is set to "1" when the post process is being executed and set to "0" when the post process is not being executed. That is, the post process in-execution flag FE is indicative of whether the second parking brake control has been ended.

When the post process is not being executed, the second-parking-brake control program represented by the flowchart of FIG. 10 is executed at S52. Each time when the second-parking-brake control program is executed, the wheel cylinder pressure Pw at that time is stored in a storage of the brake ECU 18 at S53. After the storing process, it is determined at S54 whether the end process at S46 in the second parking brake control has been executed. When the end process has not been executed, the second parking brake control is continued in next execution of the program. When the end process has been executed, the value of the post process in-execution flag FE is set to "1" at S55.

When the value of the post process in-execution flag FE is set to "1" or when the value of the post process in-execution flag FE is already set to "1", it is determined at S56 whether a value of a lock operation in-operation flag FL is 1 or 0. The lock operation in-operation flag FL is a flag whose value is set to "0" when the lock operation is not being performed and set to "1" when the lock operation is being performed. When the lock operation is not being performed, the degree of the heat slack after the present time is estimated at S57 based on the stored wheel cylinder pressures Pw, namely, based on the history of changes of the wheel cylinder pressure Pw in a time period during which the second parking brake control is executed. On the basis of the estimation, it is determined at S58 whether an additional lock operation is necessary.

When the additional lock operation is required, the control flow proceeds to S59 to determine the re-lock wait time $t_{RELOCK}$ based on the history of changes of the wheel cylinder pressure Pw. The re-lock wait time $t_{RELOCK}$ is a length of time during which the re-lock operation is waited for being started. At S60, the time counter t is incremented by the count-up time Δt. At S61, it is determined whether the time counter t has reached the re-lock wait time $t_{RELOCK}$. When the time counter t has not yet reached the re-lock wait time $t_{RELOCK}$, the increment of the time counter t is continued in next execution of the program. When the time counter t has reached the re-lock wait time $t_{RELOCK}$, the value of the lock operation in-operation flag FL is set to "1" at S62. At S63, the lock current $Ip_{LOCK}$ is determined. At S64, the subroutine for the lock operation represented by the flowchart of FIG. 9 is executed. In a case where the lock operation should be ended during execution thereof, the forward-movement end process for the piston 110 is executed at S65 in which the PB current Ip is made equal to 0, as in the process according to the first-parking-brake control program. At S66, an entire end process is executed for ending all the processes in the third-parking-brake control program. Specifically, in the entire end process, the time counter t is reset, and the post process in-execution flag FE and the lock operation in-operation flag FL are reset. After the entire end process, the third parking brake control is ended.

When it is determined at S56 that the lock operation is being executed, S57-S63 are skipped, and S64 is implemented. When it is determined at S58 that the re-lock operation is not necessary, the entire end process at S66 is executed without executing the lock operation.

What is claimed is:

1. A brake system for a vehicle, comprising:
   a wheel brake device comprising a rotary member that rotates with a wheel, a friction member configured to be pressed against the rotary member, an actuator comprising a piston and a working fluid chamber and configured to move the piston forward to cause the friction member to be pressed against the rotary member, the wheel brake device being configured to generate a braking force for the wheel;
   a working-fluid supply device configured to supply a working fluid to the working fluid chamber of the actuator such that a pressure of the working fluid is changeable; and
   a controller configured to control the brake system,
   wherein the actuator further comprises an electric motor and a piston moving mechanism configured to move the piston based on an operation of the electric motor,
   wherein the wheel brake device further functions as a parking brake by the operation of the electric motor,
   wherein the controller is further configured to execute:
      a normal brake control to control a hydraulic braking force to a magnitude corresponding to a braking request, the hydraulic braking force being a braking force that depends on the pressure of the working fluid supplied to the working fluid chamber; and
      a parking brake control to cause the wheel brake device to be operated as the parking brake, and
   wherein, in the parking brake control, the controller is further configured to:
      detect, via a wheel cylinder pressure sensor, the pressure of the working fluid supplied to the working fluid chamber;
      controls the wheel brake device to generate the hydraulic braking force at a start time of an operation as the parking brake;
      immediately after the start time at which the hydraulic braking force is generated, prohibit the working fluid from flowing into and out of the chamber for a duration of a holding time;
      while the controller prohibits the working fluid from flowing into and out of the chamber, monitor the detected pressure of the working fluid supplied to the working fluid chamber to determine whether a decrease in the hydraulic braking force occurs from heat slack generated by a contraction of the friction member due to a decrease in a temperature of the friction member, the decrease in the hydraulic braking force being a reduction degree;

in a state in which the controller monitors the reduction degree being greater than or equal to a threshold degree, controls the actuator to perform a lock operation in which the electric motor is operated to move the piston forward while the hydraulic braking force is still generated; and controls the wheel brake device to release the hydraulic braking force after the lock operation, and wherein the duration of the holding time is a length of time in which at least one lock operation is performed and the hydraulic braking force is being generated.

2. The brake system according to claim 1, wherein, in the parking brake control, the controller is further configured to control the actuator to perform the lock operation each time the hydraulic braking force is decreased by a set degree.

3. The brake system according to claim 1, wherein, in the parking brake control, the controller is further configured to determine that leakage of the working fluid supplied to the working fluid chamber is occurring when a decrease gradient of the hydraulic braking force is greater than a set gradient.

4. The brake system according to claim 1, wherein, in the parking brake control, the controller is further configured to control the actuator to additionally perform the lock operation after the hydraulic braking force is released.

5. The brake system according to claim 1, wherein, in the parking brake control, the controller is further configured to control the wheel brake device to generate, at the start timing of the operation as the parking brake, the hydraulic braking force greater than the hydraulic braking force being generated in the normal brake control.

6. The brake system according to claim 1, wherein in a state in which the lock operation is performed more than one time, the reduction degree is the decrease in the hydraulic braking force from when a preceding lock operation has ended, and wherein in the state in which the lock operation is performed more than one time, the threshold degree is a mutually different value for respective lock operations being performed at the more than one time.

* * * * *